United States Patent [19]

Rapoport et al.

[11] Patent Number: 5,519,209

[45] Date of Patent: May 21, 1996

[54] HIGH RANGE RESOLUTION ACTIVE IMAGING SYSTEM USING A HIGH SPEED SHUTTER AND A LIGHT PULSE HAVING A SHARP EDGE

[75] Inventors: William R. Rapoport, Bridgewater; Martin C. Baker, Budd Lake; Michael L. Shand, Morristown; Joseph J. Barrett, Morris Plains; Howard E. Aschoff, Wanaque, all of N.J.

[73] Assignee: AlliedSignal Inc., Morris Township, N.J.

[21] Appl. No.: 259,943

[22] Filed: Jun. 15, 1994

[51] Int. Cl.$^6$ ..................................................... H01J 40/14
[52] U.S. Cl. ................... 250/214 VT; 356/5.01; 356/5.03
[58] Field of Search ........................... 250/214 VT, 207; 313/523, 524, 525, 527, 528; 356/5.01, 5.03, 5.04, 5.06

[56] References Cited

U.S. PATENT DOCUMENTS

| | | | |
|---|---|---|---|
| 3,761,180 | 9/1973 | Maxwell, Jr. et al. | 356/5.04 |
| 3,863,166 | 1/1975 | Stimler | 359/346 |
| 3,941,483 | 3/1976 | Ferrin | 356/5.03 |
| 4,393,571 | 7/1983 | Buser et al. | 356/5.01 |
| 4,642,452 | 2/1987 | Loy | 250/213 |
| 4,708,473 | 11/1987 | Metzdorff et al. | 356/5.04 |
| 5,164,823 | 11/1992 | Keeler | 358/95 |
| 5,220,164 | 6/1993 | Lieber et al. | 250/214 VT |
| 5,303,020 | 4/1994 | Croteau | 356/5.01 |
| 5,383,200 | 1/1995 | Barrett et al. | 250/214 VT |

Primary Examiner—Edward P. Westin
Assistant Examiner—Steven L. Nichols
Attorney, Agent, or Firm—Verne E. Kreger, Jr.

[57] ABSTRACT

An active imaging system for viewing targets with a high degree of range resolution of approximately one foot. The imaging system utilizes a laser pulse which passes through an electro-optical pulse slicer which creates a sharp leading edge and/or a sharp falling edge on the laser pulse. The laser pulse travels to the target under observation, illuminates and reflects off of the target and returns to a camera. A target is viewed only during the time all or a portion of the returning laser pulse overlaps the time the camera shutter gate is open. The imaging system is particularly suited for determining depth information about a target by varying the time relationship when the returning laser pulse is received by the camera.

12 Claims, 2 Drawing Sheets

HIGH RANGE RESOLUTION ACTIVE IMAGING SYSTEM USING A HIGH SPEED SHUTTER AND A LIGHT PULSE HAVING A SHARP EDGE

BACKGROUND OF THE INVENTION a. Field of the Invention

This invention relates to laser-illuminated active viewing systems.

b. Description of Related Art

Passive night vision imaging devices, based on microchannel plate (MCP) image intensifiers, are capable of up to a million fold multiplication of available light. The phosphor screen output of such devices can be directly coupled or imaged onto a video camera for viewing on a TV monitor. However, passive night vision devices have severe limitations. Frequently the amount of ambient light is insufficient for proper target illumination, and targets cannot be identified, especially at long ranges. In that event, active illumination is required.

Active illumination systems based on gated image intensified cameras coupled with pulsed lasers have existed for several years. The gating of the intensifier inside the camera allows the foreground and/or background of a target to be removed from the field of view of the camera. The benefit of foreground removal is that the atmospheric backscatter from the pulsed laser source is eliminated yielding a much greater signal to noise ratio (S/N) of the target of interest and the ability to silhouette the target.

The camera gate is controlled by a voltage applied to the camera intensifier. 250 volts is required to shutter a Gen II image intensifier tube which provides a minimum gating time of about 5 nanoseconds due to the large voltage, parasitic capacitance, and the impedance of the voltage source. The best response for the photocathode for these cameras is in the 350–900 nm range with sensitivity peaking in the 500 nm spectral range. A Gen III image intensifier tube can also be considered because it has a higher quantum efficiency, but due to its construction, the gating rise and fall times are significantly longer for the identical driving impedance. A Gen III device requires switching about 700 volts which increases the minimum gating time to about 70 nanoseconds for conventional devices. Special devices, however, can be constructed with faster response times. The photocathode response for these tubes is from 600 nm to 900 nm with a peak sensitivity at about 820 nm. The QE of current Gen II devices is in the range of 8% while the Gen III devices can be as high as 30%. A typical laser used for this application is a pulsed laser diode or an alexandrite laser for imaging at much greater distances.

It is also possible to use a new class of Transferred Electron (TE) photocathodes which have responses out to 1.7 μm. These devices can be constructed with internal microchannel plate intensifiers or connected to a device to produce a rapid gateable intensified CCD array camera. Laser sources for these include tunable Optical Parametric Oscillators (OPO's) which can cover the entire spectral region.

U.S. Pat. No. 4,642,452 to Loy discloses an integrated active night vision system consisting of a low power near infrared illumination source, an intensified receiver and monitor. Illumination is provided by low power light flashes of very short duration. The light source is either a diode laser which emits pulses on the order of a microsecond in the near infrared, or a flashlamp with output pulses of 10–20 milliseconds duration which are passed through an infrared filter. The intensifier is gated to reduce atmospheric backscatter. The system disclosed, however, suffers from poor range resolution.

The gaussian temporal shape of the outgoing laser pulse of existing active imaging systems can give some range information, but it is limited. Accordingly, it would be advantageous to obtain more accurate distance and depth information about a target being viewed from large distances. This includes information about the size of the target, and separation of features located on the target, as well as distance of the target from the camera/laser arrangement.

SUMMARY OF THE INVENTION

This invention provides an active vision system capable of viewing a target with a high degree of range resolution in various transparent or semi-transparent medium such as air, water or a vacuum over distances greater than 30 feet using a laser pulse that can be very long in pulse duration and a camera that has a gate width greater than 5 ns. Range resolution is meant to mean imaging a target in variable depth slices with a minimum incremental depth change of approximately one foot and/or, obtaining precise range (distance) information of the target and of features on the target.

The invention comprises in combination:

(a) illuminating means for emitting a beam pulse of light radiation having a wavelength from 0.35 to 2.32 μm for illuminating a target;

(b) rejecting means for rejecting either the front, back or both ends of the out going beam pulse creating one or more very steep temporal edges;

(c) receiving means for receiving an image of the reflected light where the receiver has an electronically controlled shutter with at least one edge of the shutter having a sharp rising or falling edge;

(d) control means to control the shutter at one nanosecond intervals; and (e) electronic means for analyzing said target image received by the receiving means.

Specifically, the active imaging system functions by emitting a laser pulse through an electro-optical pulse slicer which creates a sharp leading edge and/or a sharp falling edge on the laser pulse. The electro-optical pulse slicer may be external to the laser source or may be internal to the laser cavity, as is the case for a Pulse Transmission Mode (PTM) laser. The sharp edge of the laser pulse initiates a range gate clock. The gate clock regulates the voltage to the intensifier gate, which acts as a shutter to the camera. The shutter open time duration (the gate width) is pre-set, but is variable to control the depth of the target being imaged. The laser pulse travels to the target under observation, illuminates and reflects off of the target and returns to the camera. A target is viewed only during the time all or a portion of the returning laser pulse overlaps the time the shutter gate is open. Accordingly, if there is no overlap, then no image is observed. This function allows laser backscatter or nearby light to be eliminated from the image and also eliminates blooming that could be caused by lights or fire within the field-of-view. This also allows the imaging system to operate in daylight if sufficiently narrow bandpass filters are employed in the camera. A telescope collects the light and images it on the photocathode. This light is effectively amplified in the micro-channel plate (MCP) image intensifier. The electron output is converted to photons at the phosphor screen, then imaged onto a high resolution charge coupled device (CCD) array. The signal may then be acted upon depending on the application. For example the signal may be electronically analyzed, stored or display or processed using available image processing software. A display application may process the signal into a standard RS-170 format and transfer it to a frame grabber, display and recorder.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which.

DETAILED DESCRIPTION OF THE INVENTION

The following detailed description, which describes only the preferred embodiment of the invention, is understood only to be an illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

Figure 1:
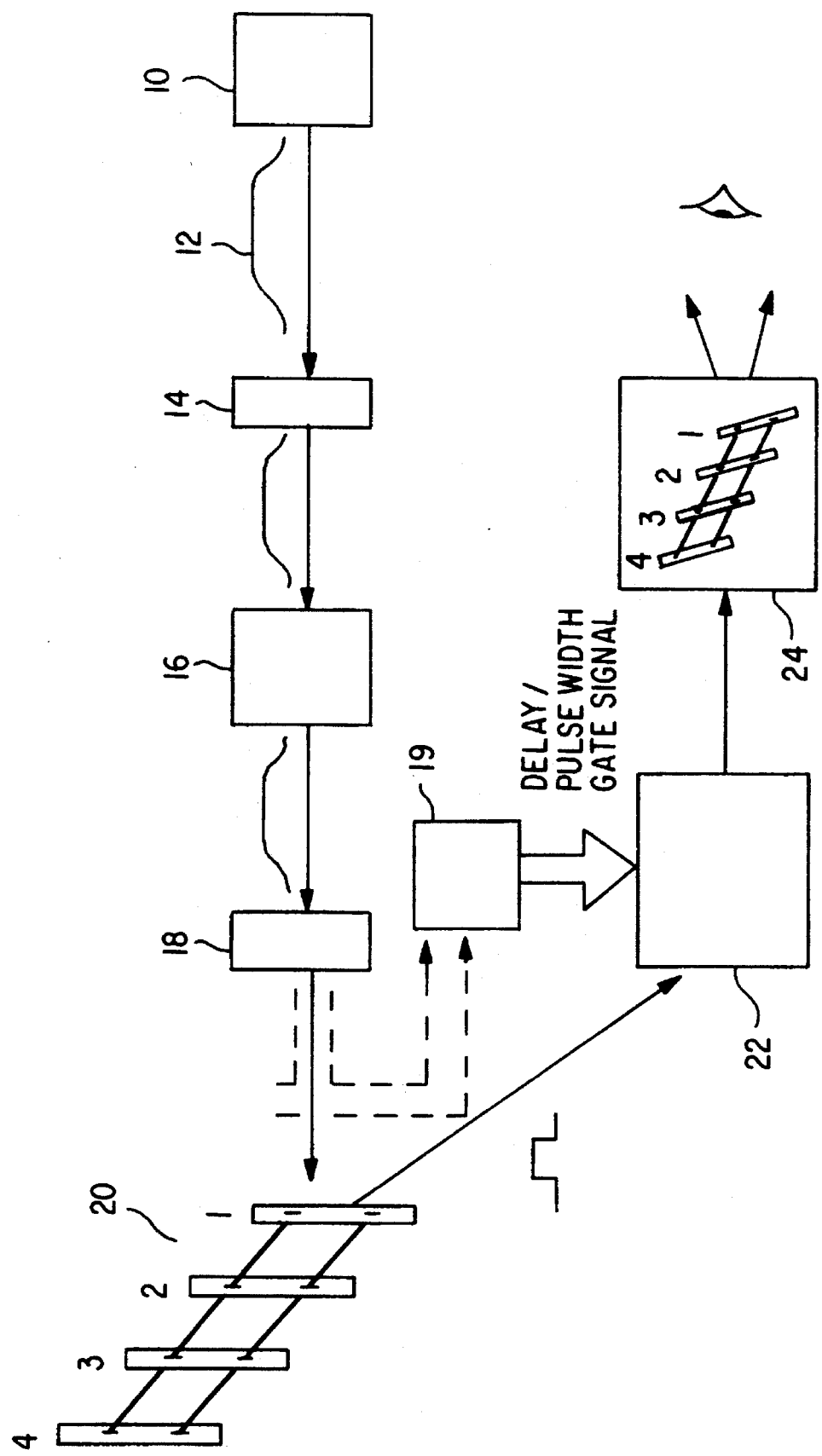
FIG. 1 is a schematic representation of the invention.

Referring to FIG. 1, a light generating means 10, preferably a laser, emits a beam pulse 12 of coherent light radiation that illuminates a target 20. The beam of coherent radiation is preferably in the high sensitivity response range of a Gen II, Gen III or TE photocathode image intensifier tube and desirably having at least an 80% transmission rate through the medium over distances exceeding 2 kilometers. The invention is capable of operating with beams of radiation at lower transmission levels, but with reduced range capabilities for the same source power. The output of the laser 10 is ideally polarized, but if not, the output can be polarized using a polarizing optic 14 that passes one polarization component. The laser output is emitted in short pulse durations by a method known as Q-switching and the temporal pulse shape typically resembles a skewed gaussian. The pulse passes through the polarizing optic 14, if required, and then passes through a rejecting means 16 for rejecting the front, back or both ends of the pulse 12.

The rejecting means may be any electro-optical pulse slicer such as a Pockels' cell when combined with an exit polarizer. The Pockels' cell provides a rapid polarization change in the polarization state of the laser beam 12 passing through it. In the case where one edge, either the rising or falling edge, is sliced, the Pockels' cell is biased in Lambda/2 state, (Lambda ($\lambda$) being the laser wavelength) by placing a voltage across one of the terminals of the Pockels' cell. The voltage rotates the polarization state of the laser beam transmitted through the cell by 90°. The output from the Pockels' cell passes through an exit polarizer 18 which passes one polarization state while rejecting the other. In this case where the laser beam input to the Pockels' cell is horizontally polarized, it is rotated to vertical polarization by the Pockels' cell. If the exit polarizer is oriented to pass horizontal polarization, the output of the system is zero since the vertically polarized light is rejected by the exit polarizer. If during the pulse, the voltage across the Pockels' cell is rapidly reduced to zero, the polarization state of the light then passing through the cell rotates by 90°. The exit polarizer then passes that light creating a sharp leading edge on the transmitted out going laser pulse. To create a sharp falling edge, the exit polarizer is rotated so that it passes vertically polarized light. The voltage across the Pockels' cell is rapidly reduced to zero and the polarization state of the light passing through the cell rotates by 90°. The exit polarizer then rejects the light creating a sharp falling edge on the transmitted out going laser pulse. The sharp edge is a function of the speed of the polarization state change which is dependent upon the speed of the electronics and the physical constants of the Pockels' cell crystal and the physical dimensions and construction of the Pockels' cell.

Another occasion that requires pulse slicing is when the laser pulse is longer than the desired output pulse length. The same arrangement is in place as previously described, but the Pockels' cell is differentially operated. In this case, the $\lambda/2$ voltage is applied to both terminals. Since the voltage differential across the cell terminals is zero, no net rotation of the polarization state of the laser beam traveling through it occurs. The exit polarizer is orthogonally oriented to the entrance polarizer so that no laser light is passed by this arrangement within the contrast ratio of the components. While the laser pulse is passing through the Pockels' cell, the voltage on one of the terminals is reduced to zero, thus rotating the polarization state by 90°. The exit polarizer rejected the leading part of the pulse and now transmits the remainder of the pulse with a sharp leading edge. When the desired (and variable) pulse width is emitted, the second terminal voltage is reduced to zero. There is now no net polarization rotation of the beam (the differential voltage across the cell is zero) and the remainder of the output is rejected. The transmitted pulse now has sharp rising and falling edges. This situation is also possible by applying a $\lambda/2$ voltage to the Pockels' cell with the two polarizers orthogonally oriented. The applied electrical pulse width will determine the output laser pulse width. Generally it is easier to remove the voltage from the Pockels' cell than it is to apply it with sufficient speed. It is also possible to emit fixed pulse widths through the use of a single switch by operating the Pockels' cell in the differential mode and using an un-terminated transmission line to produce the correct pulse width. By changing the transmission line length, the pulse width can be varied.

The ability to image a target with a high degree of range resolution comes from the sharpness of the edge of the laser pulse and the sharpness of the edge of the camera shutter which is representative of rapid shutter open and close times. The rise or fall time of the laser pulse is governed by the electro-optical Pockels' cell which has a transmission T:

$$T = \sin^2[(\pi/2)(V/V_{1/2})] \qquad (1)$$

where $V_{1/2}$=half wave voltage for a specified wavelength $\lambda$ and V=the applied voltage. $V_{1/2}=\lambda(2n_o^3r_{63})$ for a longitudinal field Pockels' cell where $n_o$ is the refractive index, $\lambda$ is the wavelength and $r_{63}$ is the material non-linear constant, and $V_{1/2}=\lambda d/(2ln_o^3r_{63})$ for a transverse field Pockels cell where d is the electrode separation and l is the crystal length.

The response is non-linear as V approaches $V_{1/2}$ due to the $\sin^2$ relationship, therefore, the transmission rises faster than the voltage risetime. Typical devices used for switching the high voltages are Krytrons ($\approx$1 ns rise), planar triodes ($\approx$2 ns rise), and avalanche transistors ($\approx$2 ns rise). It has been demonstrated that these switches combined with the Pockels' cell can produce optical pulses with edges that have 10 to 90% rise/fall times of approximately 1 ns.

There are many combinations of polarizers, Pockels' cell, and exit polarizers that will create a sharp rising or falling edge on the outgoing laser pulse. These alternate methods are known to those skilled in the art.

The sharp leading or falling edge of the outgoing pulse 12 triggers a variable delay/pulse width generator 19 that controls the gating to an intensified camera 22. The sharp pulse edge reduces the amount of timing error (jitter) that would be evident if the gaussian slope or "soft" edge of the laser pulse controlled the gate. Generator 19 controls both the delay time and the pulse width of the control gating signal to the intensified camera 22. The delay time is that time from the generator's receipt of the sharp edge to the time a gate control signal is sent to the intensified camera 22. The pulse width is the time the gate control signal is applied to the intensified camera 22. Both times can be varied by the operator in approximately 1 ns increments. The imaging system preferably has a readout that allows the pulse width and delay settings to be observed and recorded. The electronics that operate the camera shutter (intensifier) and the delay/pulse width generator must possess low timing error with respect to the input trigger pulse, as for example intensifiers and associated controls manufactured by Xybion. Once the target is viewed on the video monitor 24, the camera gating delay signal from the generator can be increased or decreased in time to allow for approximately 1 foot resolution steps through the target. The stepping must be done on the sharp edge of the laser pulse to achieve the range resolution. The camera gate width controls the range depth that the camera "sees".

The camera "sees" all reflected illuminated targets during the time the shutter to the camera is open until the time the shutter closes. Reflected source light that is collected by the receiver when the shutter is closed is not acquired. Accordingly, a target is viewed only during the time all or a portion of the returning laser pulse overlaps the time the camera gate is open. If there is no overlap, then no video is observed. For example, if the laser pulse and open shutter overlap for 6 ns, then 3 feet of the target can be seen (speed of light equals 0.98 feet/ns) assuming that the operation is taking place at an edge of the target. It doesn't matter how long the camera gate or the laser pulse are, but only when the light edge overlaps the camera gate edge.

The image intensifier has a non-linear output as a function of applied voltage so that detectable intensity is seen as rising faster than the applied voltage risetime. This is partially due to the CCD array which has a low S/N ratio and the high background level from the intensifier. This appears to create an image that rises faster in time than the applied voltage. GEN II image intensifier-based cameras have demonstrated gate widths of approximately 5 ns with shutter rise and fall times of approximately 5 ns and optical signal transitions of approximately 1 ns.

In order to achieve the stated one foot resolution, the imaging system operates as follows: Image acquisition begins with sync signals stripped from the CCD array camera to provide rough synchronization of the laser pulse to the camera. A transmitted laser pulse has the leading edge chopped off by the pulse slicing arrangement described above. This output may be homogenized via a fiber optic or light pipe or any other such means as known by those skilled in the art in order to uniformly illuminate the target area. The output is diverged so that the entire target or the desired fraction of the target is illuminated. The leading edge starts a delay generator with a high resolution counter. At a time corresponding to the round trip time of the laser pulse to the target and back to the camera (2 times the distance to the target governed by the speed of light), the delay generator instructs the camera shutter to open for a pre-set gate duration. The camera then "sees" at a distance $$D=(c/n)(t/2) \qquad (2)$$

where c is the speed of light ($2.998\times10^8$ m/s), n is equal to the refractive index of the media, where air is approximately 1 and water is approximately 1.33 and t is the total delay time:

$$t=t_{cable1}+t_{delay}+t_{gate}+t_{cable2}+t_{camera}$$

where $t_{cable1}$ and $t_{cable2}$ are the pulse delay times introduced by the connecting cables, $t_{delay}$ is the generator delay time, $t_{gate}$ is the gate width time of the camera shutter and $t_{camera}$ is the fixed response delay time introduced by the camera.

EXAMPLE 1

In the case for a laser pulse in air with a sharp leading edge and a camera shutter with a sharp falling edge, the distance to the target marked by the sharp contrast video signal is:

$$D=(c/2)(t_{cable1}+t_{delay}+t_{gate}+t_{cable2}+t_{camera}) \qquad (3)$$

Figure 2:
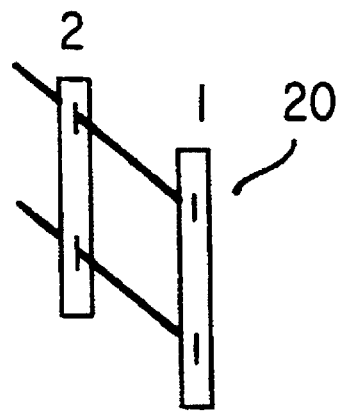
FIG. 2 is a partial image of a target viewed by the invention where only a front portion of the target is viewed.

The image seen will have an illuminated foreground and a sharply contrasted background. The best application of this example is to illuminate the whole target, using a combination of $t_{delay}$ and the gate width sufficient to illuminate the entire target and part of the background. By incrementally decreasing $t_{delay}$, the background of the target will slowly disappear from the video display. That is, the gate width will overlap only that portion of the returning laser pulse that illuminates the target, but not the portion of the returning laser pulse that illuminates the background. By further decreasing $t_{delay}$ the gate width will overlap only that portion of the returning laser pulse that illuminates the front end of the target 20, but not the portion of the returning laser that illuminates the back end of target 20, as shown in FIG. 2. Only the front posts 1 and 2 would be illuminated and displayed, while the rear posts 3 and 4 would be removed from view. Varying $t_{delay}$ allows the target to be viewed in variable depth increments of about one foot. That is, decreasing $t_{delay}$ would remove post 2 from FIG. 2 or increasing $t_{delay}$ would add post 3 to FIG. 2. Another method is to start with the system illuminating only the front edge of the target and increasing $t_{delay}$ until the whole target has been illuminated. The camera gate width, $t_{gate}$, controls the amount of foreground that the camera "sees". The video picture coupled with the settings from the delay/pulse width generator yields quantitative distance information about physical features on the target.

EXAMPLE 2

In the case of a sharp falling edge on the laser pulse and a sharp rising edge on the camera shutter, the distance to the target is:

$$D=c/2(t_{cable1}+t_{delay}+t_{cable2}+t_{camera}) \quad (4)$$

Figure 3:
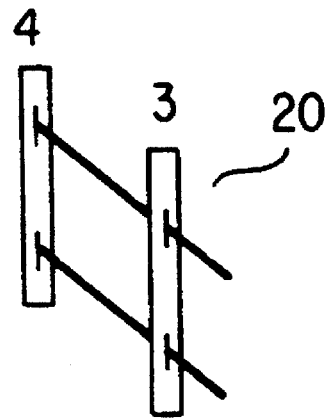
FIG. 3 is a partial image of a target viewed by the invention where only a back portion of the target is viewed.

In this example, the sharp falling edge of the light pulse triggers the delay/pulse width generator. The image seen will have an illuminated background and a sharply contrasted foreground. The best use of this case is to start at the front of the target and to increase $t_{delay}$. The whole target is illuminated in the beginning. As $t_{delay}$ is increased, the front part of the target 20 disappears from the video display as shown in FIG. 3. Varying $t_{delay}$ allows the target to be viewed in variable depth increments of about one foot. The case can be operated in the reverse direction with the target's farthest points being illuminated first and decreasing $t_{delay}$ until the target is fully illuminated. The camera gate width, $t_{gate}$, controls the amount of background that the camera sees but does not enter into the distance equation.

EXAMPLE 3

Figure 4:
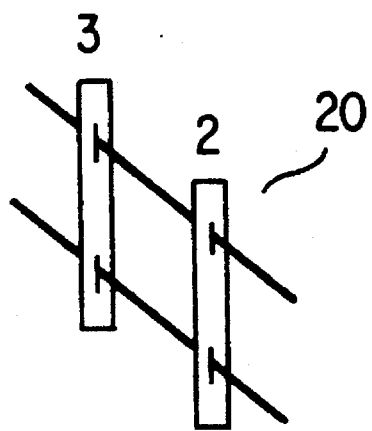
FIG. 4 is a partial image of a target viewed by the invention where only a center portion of the target is viewed.

Another case is to have sharp rising and falling edges on both the laser pulse and on the camera shutter. The same calculations apply in this case as previously described depending whether the target is measured from the front or the back. The advantage of this case is that the laser pulse and camera gate can be made very short in time (a few ns). It is now possible to step through the target in increments of about one foot in either direction to obtain accurate distance information of various objects on the target with the minimum of foreground and background being illuminated. This allows the central parts of target 20 to be probed while not displaying the front or back as shown in FIG. 4. This can increase the S/N ratio for a higher probability of identification. Accordingly, significant objects within a target (here, posts 2 and 3) may be identified and the spatial relationship between the objects may be measured and identified. This would allow the observer to compare the relationship of the measured objects with a known database to accurately determine the identify of a target. For example, if an aircraft was being imaged and the distance from the wing to the tail of the aircraft was measured and then compared with known dimensions of aircraft, positive identification can be made.

In each Example, the camera "sees" laser light reflected from targets that corresponds to the distance/time relationship described above. The light is collected by a low f# telescope and imaged onto the intensified camera. The camera may then convert the image into an RS-170 output for further processing. Light that was reflected back before the camera shutter was opened is lost as is light that arrives after the shutter is closed. Therefore, the camera will view images from increased distances the longer the shutter remains open. When the camera shutter closes, the farthest image that is viewed is that target at the distance that corresponds to ½ the round trip time of the laser pulse from the camera to the target. Accurate distances can be measured by changing the gate width so that the closing of the shutter corresponds to the region of the leading edge of the laser returning to the camera (fixed delay times arising from the cable delays, generator response time and camera response time must be added to obtain the correct distances). By incrementally decreasing $t_{delay}$, while maintaining a constant $t_{gate}$, a very sharply defined light/dark transition can be observed. Objects in front of the main target are well illuminated and objects just beyond the gate width are not. The transition between illuminated and not illuminated exhibits high contrast. Depth information about the target can be discerned by placing the gate so that the farthest point of the target is illuminated and then successively shortening the gate in known intervals, which has the effect of removing the farthest parts of the target from the video display. This can also be accomplished by placing the end of the camera gate at the front of the target and increasing the gate until the farthest point of the target has been illuminated and the light reflected back.

The camera shutter gate width is not required to be short. The effect of shortening the gate width has the effect of removing both the foreground and the background in the area of interest. This can be useful in some situations where it is desirable to locate the target first, then obtain measurement data on it. If the gaussian slope or "soft" edge of the pulse is used, the contrast is very low and only rough values of distance are achievable.

The combined case occurs when both edges of the out going pulse (Example 3) and camera shutter are sharp. A narrow gate on the camera can be swept through the target from either direction. If the camera gate width is sufficiently narrow, it is possible to isolate details that occur on the target being illuminated without seeing the whole target. In this case, the camera will capture distance separation information of physical components on the target that corresponds to ½ pulse width +½ the camera gate width. This assumes that there are physical components on the target that occur on either side of the isolated details.

Another useful property is to set the camera gate width (for example 50 ns corresponding to approximately 25') and to step through from past the target to well in front of the target. This rough distance approach has a clutter removal property that yields rough 3-D data.

The output from the camera may be in standard RS-170 format. This output is sent to frame grabbers, display monitors and recording devices. The image rate can be single shot but the preferred rate is between 1 and 30 pulses per second, although any rate can be used. The image can be captured by a frame grabber and held until the next pulse is received. This removes flicker from the display unit.

It will be understood that the particular embodiments described above are only illustrative of the principles of the present invention, and that various modifications could be made by those skilled in the art without departing from the scope and spirit of the present invention, which is limited only by the claims that follow.

What is claimed is:

1. An active imaging system for viewing a target with a high degree of range resolution in a medium comprising:
   (a) illuminating means for emitting a beam pulse of light radiation having a front edge and a back edge and having a wavelength from 0.35 to 2.32 μm for illuminating said target:
   (b) rejecting means for rejecting at least one edge of the out going beam pulse thereby creating at least one steep temporal edge;
   (c) receiving means for receiving light reflecting off said target and comprising an electronically controlled shutter with at least one edge of the shutter having a sharp rising or falling edge, wherein said receiving means receives reflected light during the time the shutter is open until the time the shutter is closed;
   (d) control means responsive to said steep edge to control said shutter open time and close time; and (e) means for processing said target image received by said receiving means.

2. An active imaging system of claim 1 wherein said medium is air.

3. An active imaging system of claim 1 wherein said medium is water.

4. An active imaging system of claim I wherein said medium is a vacuum.

5. An active imaging system of claim I wherein said shutter open time is responsive to said control means in at least one nanosecond increments.

6. An active imaging system for viewing a target and its associated foreground comprising:
   (a) illuminating means for emitting a beam pulse of light radiation having a wavelength from 0.35 to 2.32 μm fix illuminating said target;
   (b) rejecting means for rejecting the front end of the out going beam pulse thereby creating a steep temporal front edge;
   (c) receiving means for receiving light reflecting off said target and comprising an electronically controlled shutter having a sharp falling edge, wherein said receiving means receives reflected light during the time the shutter is open until the time the shutter is closed;
   (d) control means responsive to said steep front edge to open said shutter for the time period required for light to travel two times the distance between said target and imaging system: and
   (e) display means for electronically displaying said target image and foreground image received by said receiving means.

7. The active imaging system of claim 6 wherein said control means further comprises delay means for viewing said target in variable depth increments.

8. An active imaging system for viewing a target and its associated background comprising:
   (a) illuminating means for emitting a beam pulse of light radiation having a wavelength from 0.35 to 2.32 μm for illuminating said target;
   (b) rejecting means for rejecting the back edge of the out going beam pulse thereby creating a steep temporal back edge;
   (c) receiving means for receiving light reflecting off said target and comprising an electronically controlled shutter having a sharp rising edge, wherein said receiving means receives reflected light during the time the shutter is open until the time the shutter is closed;
   (d) control means responsive to said steep back edge for generating a time delay before opening said shutter; and
   (e) display means for electronically displaying said target image and background image received by said receiving means.

9. The active imaging system of claim 8 wherein said control means further comprises delay means for viewing said target in variable depth increments.

10. An active imaging system for viewing a target comprising:
    (a) illuminating means for emitting a beam pulse of light radiation having a wavelength from 0.35 to 2.32 μm for illuminating said target;
    (b) rejecting means for rejecting the front edge and back edge of the out going beam pulse thereby creating a steep temporal front and back edge;
    (c) receiving means for receiving light reflecting off said target and comprising an electronically controlled shutter having a sharp rising and falling edge, wherein said receiving means receives reflected light during the time the shutter is open until the time the shutter is closed;
    (d) control means responsive to said steep front and back edge to open said shutter; and
    (e) display means for electronically storing and displaying said target absent said the foreground and background of said target.

11. The active imaging system of claim 10 wherein said control means further comprises delay means for viewing said target in variable depth slices.

12. An active imaging system for ranging a target comprising:
    (a) illuminating means for emitting a beam pulse of light radiation having a front edge and a back edge and having a wavelength from 0.35 to 2.32 μm for illuminating said target;
    (b) rejecting means for rejecting the front edge of said out going beam pulse thereby creating a steep temporal front edge;
    (c) receiving means for receiving light reflecting off said target and comprising an electronically controlled shutter having a sharp falling edge;
    (d) control means responsive to said steep front edge to open said shutter and responsive to said front edge returning to said receiving means to close said shutter; and
    (e) timing means to measure the time from said control means responsive to said steep front edge to the time said receiving means receives the reflected front edge of said beam pulse.

* * * * *